United States Patent Office 3,054,187
Patented Sept. 18, 1962

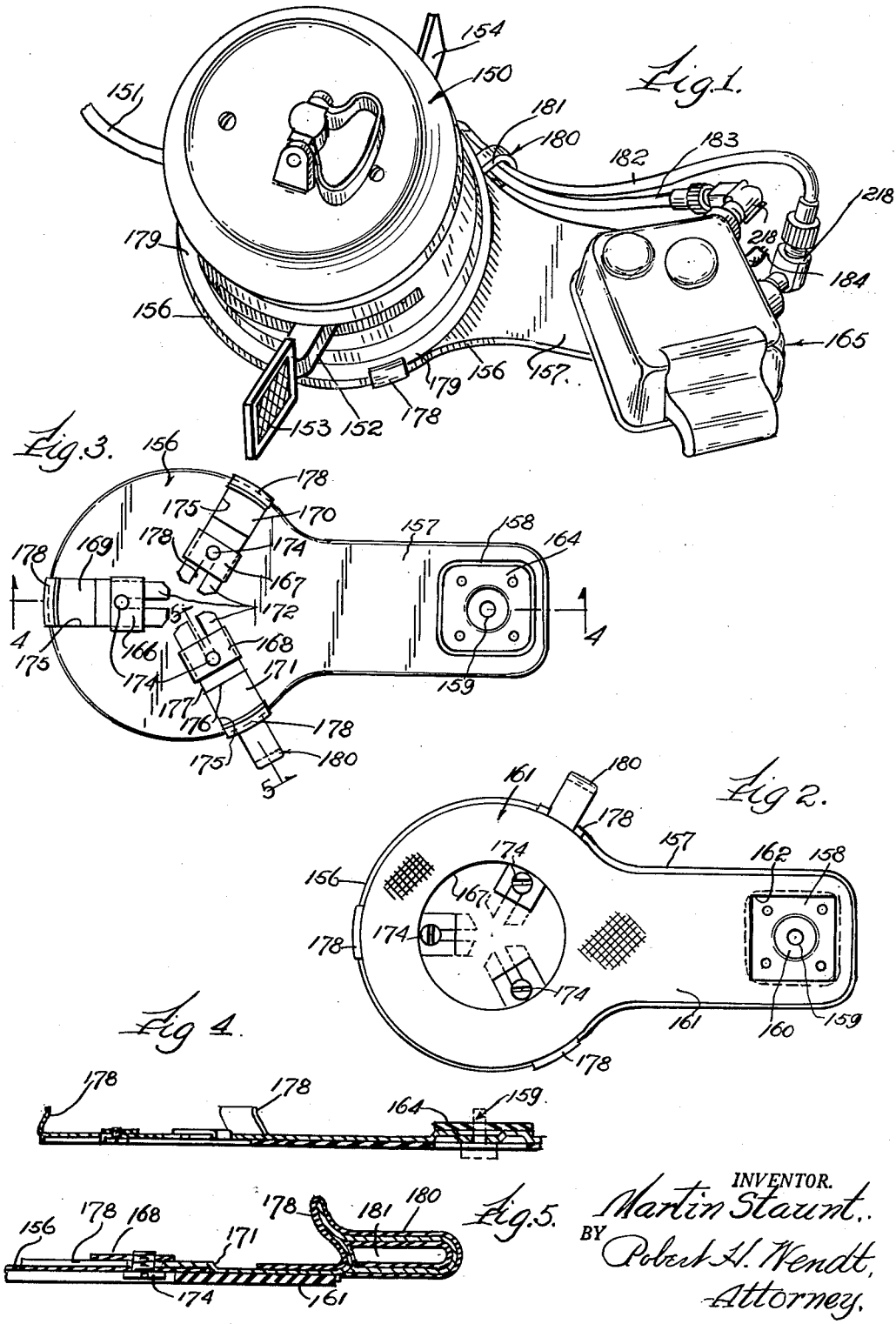

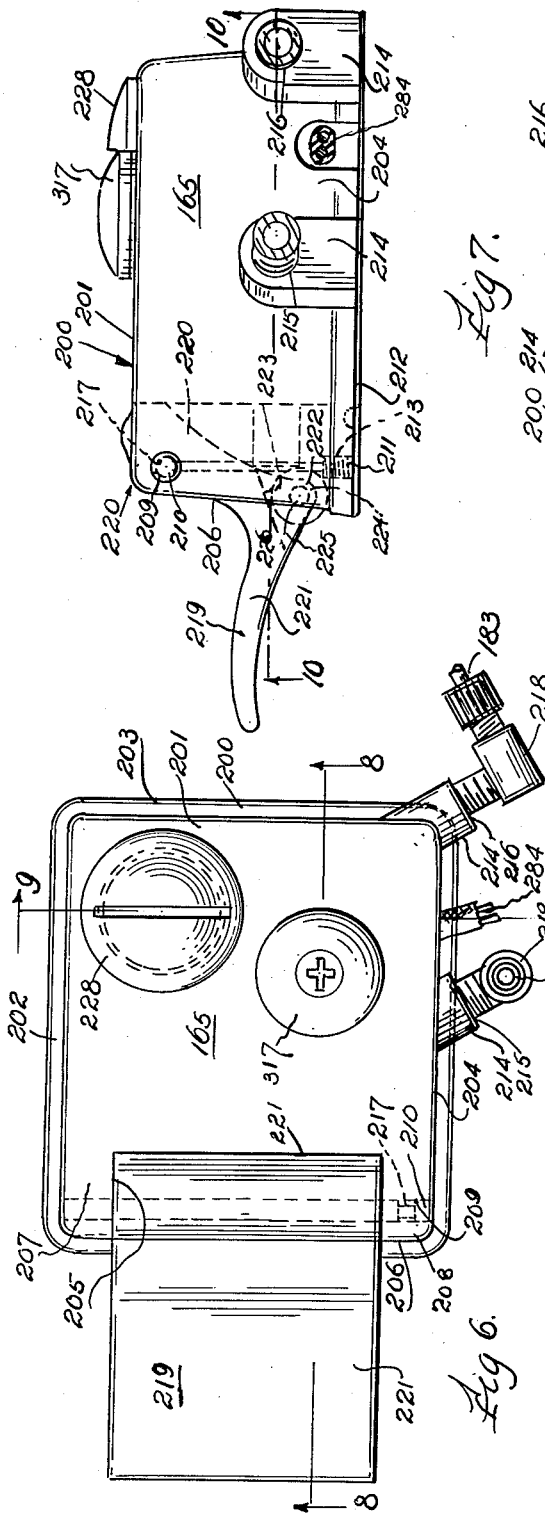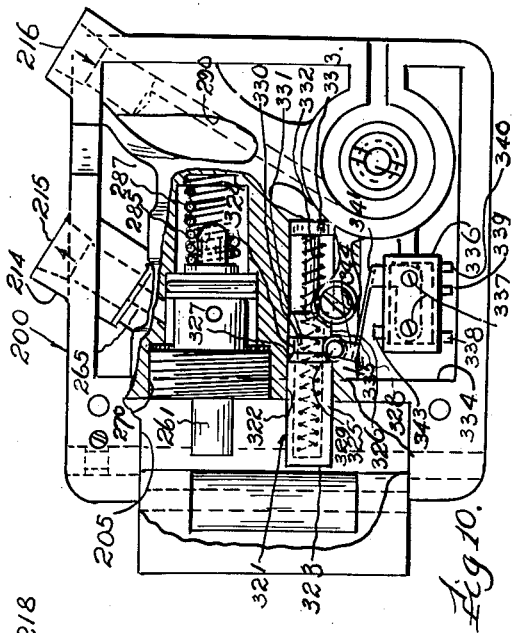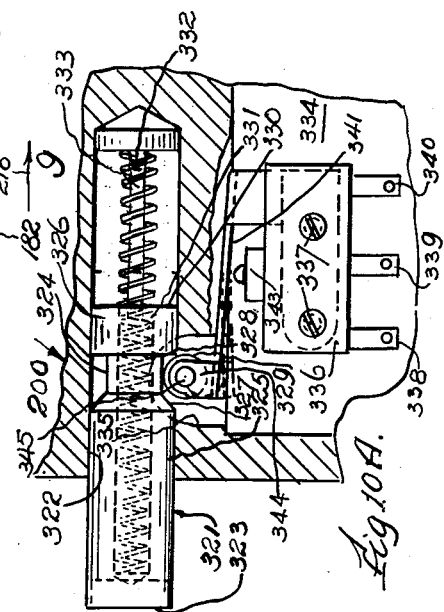

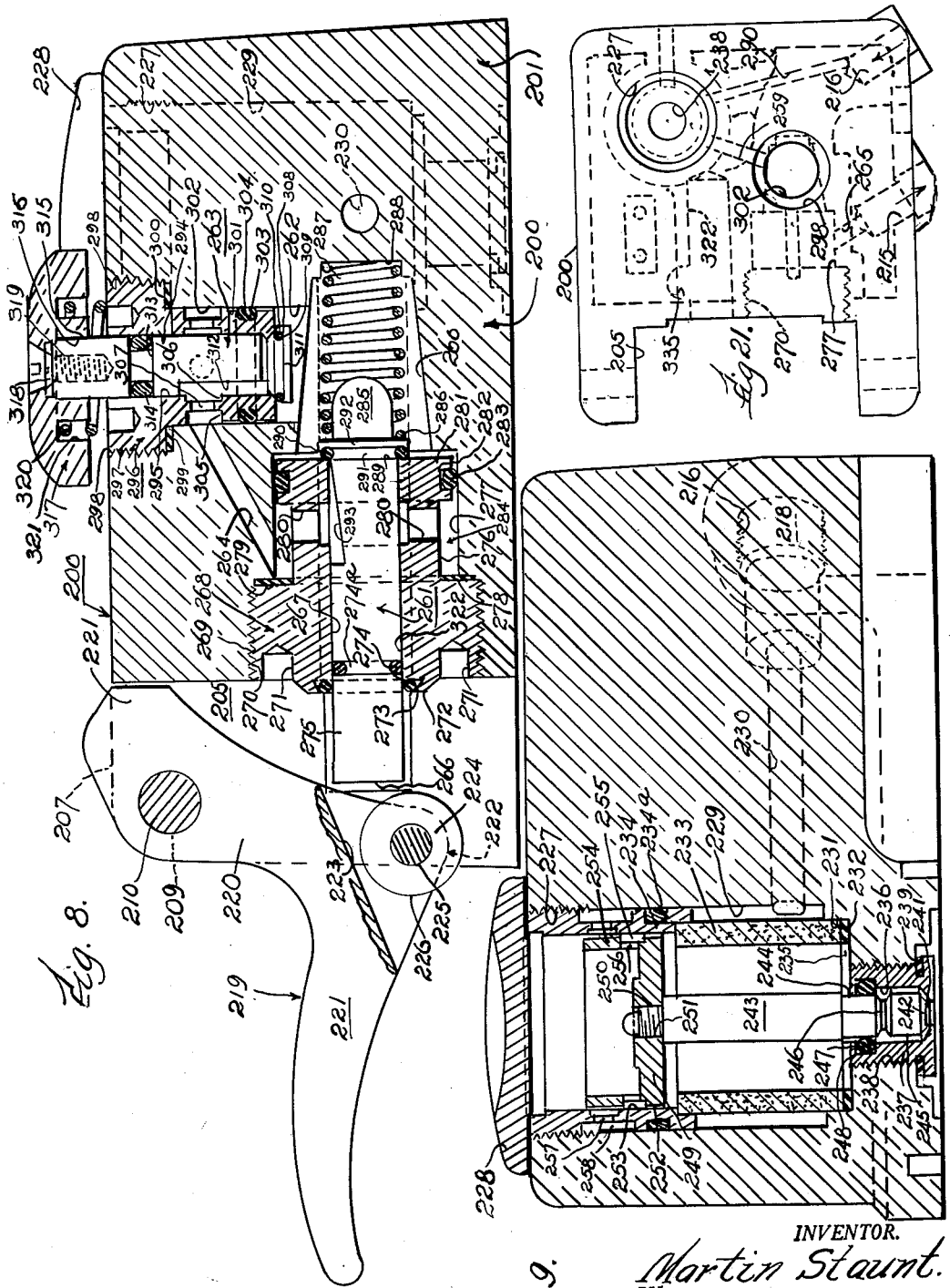

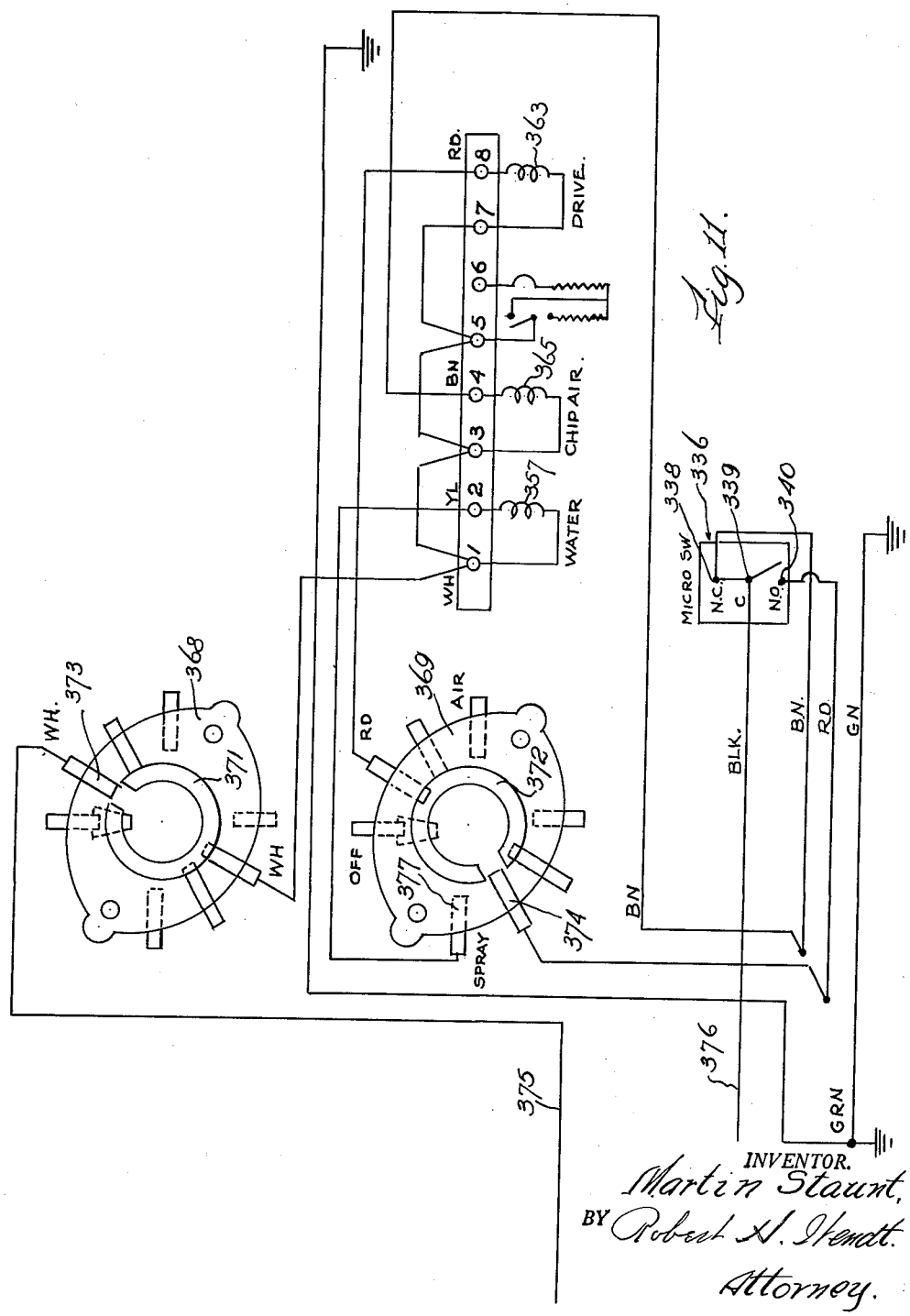

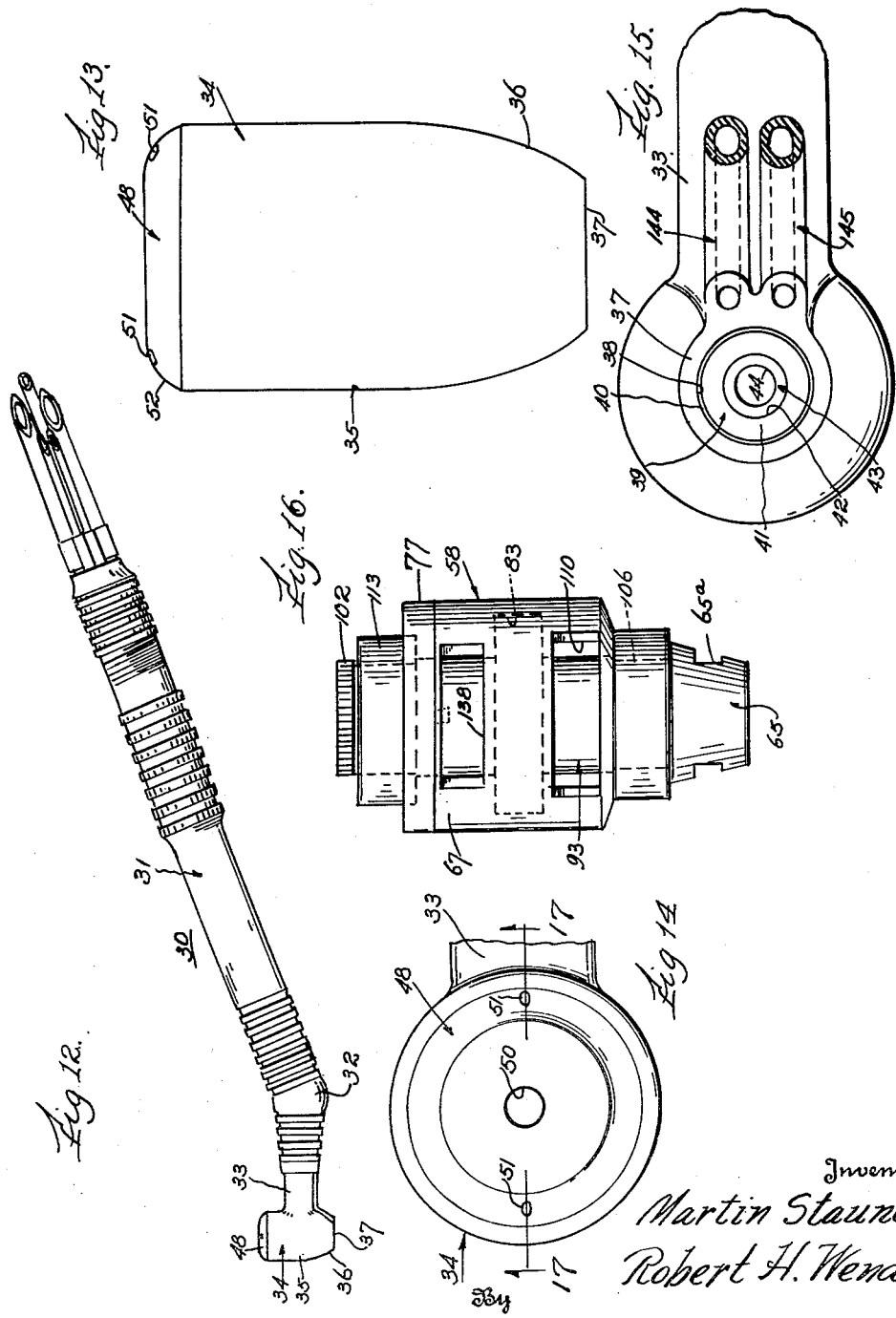

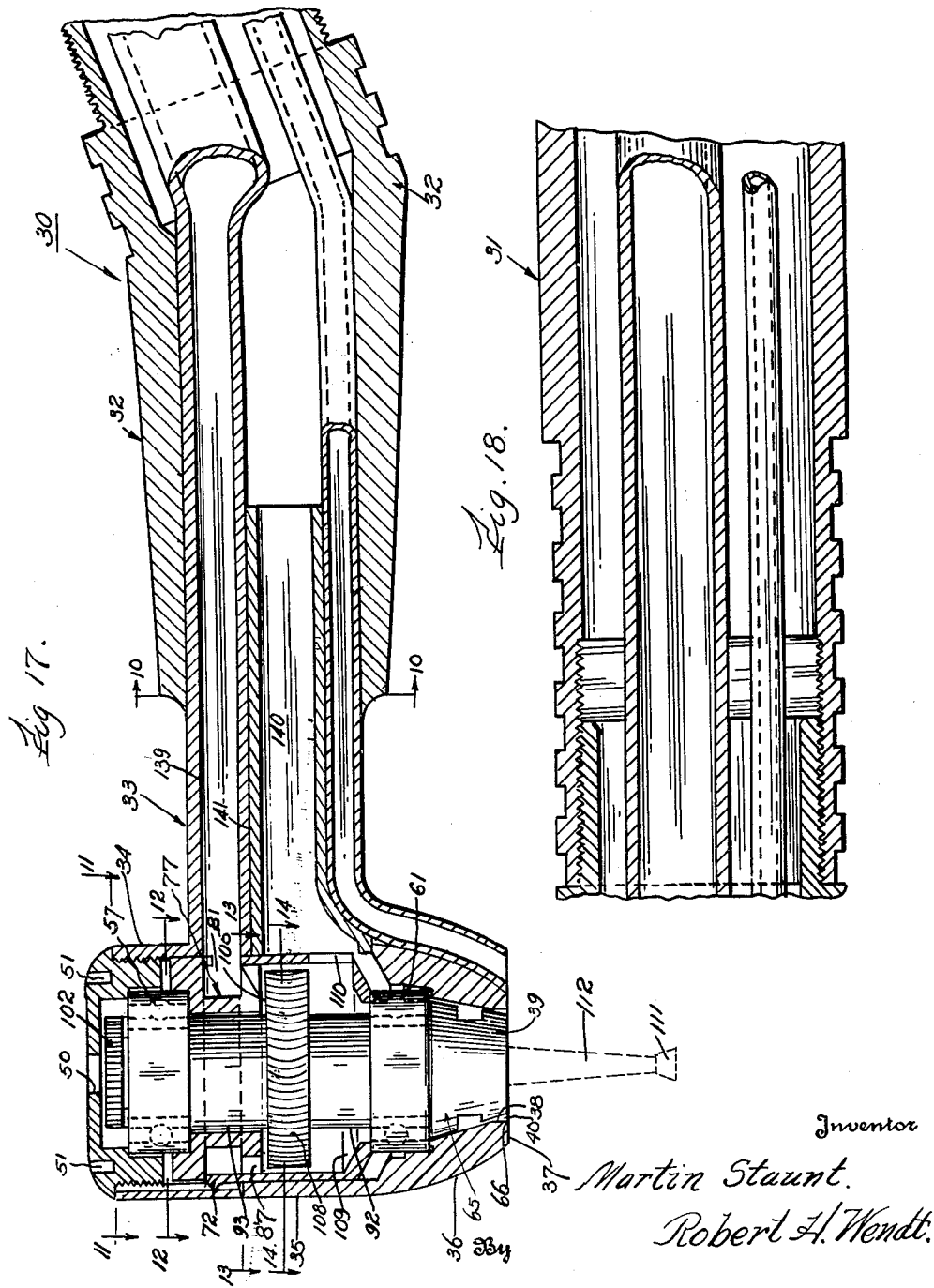

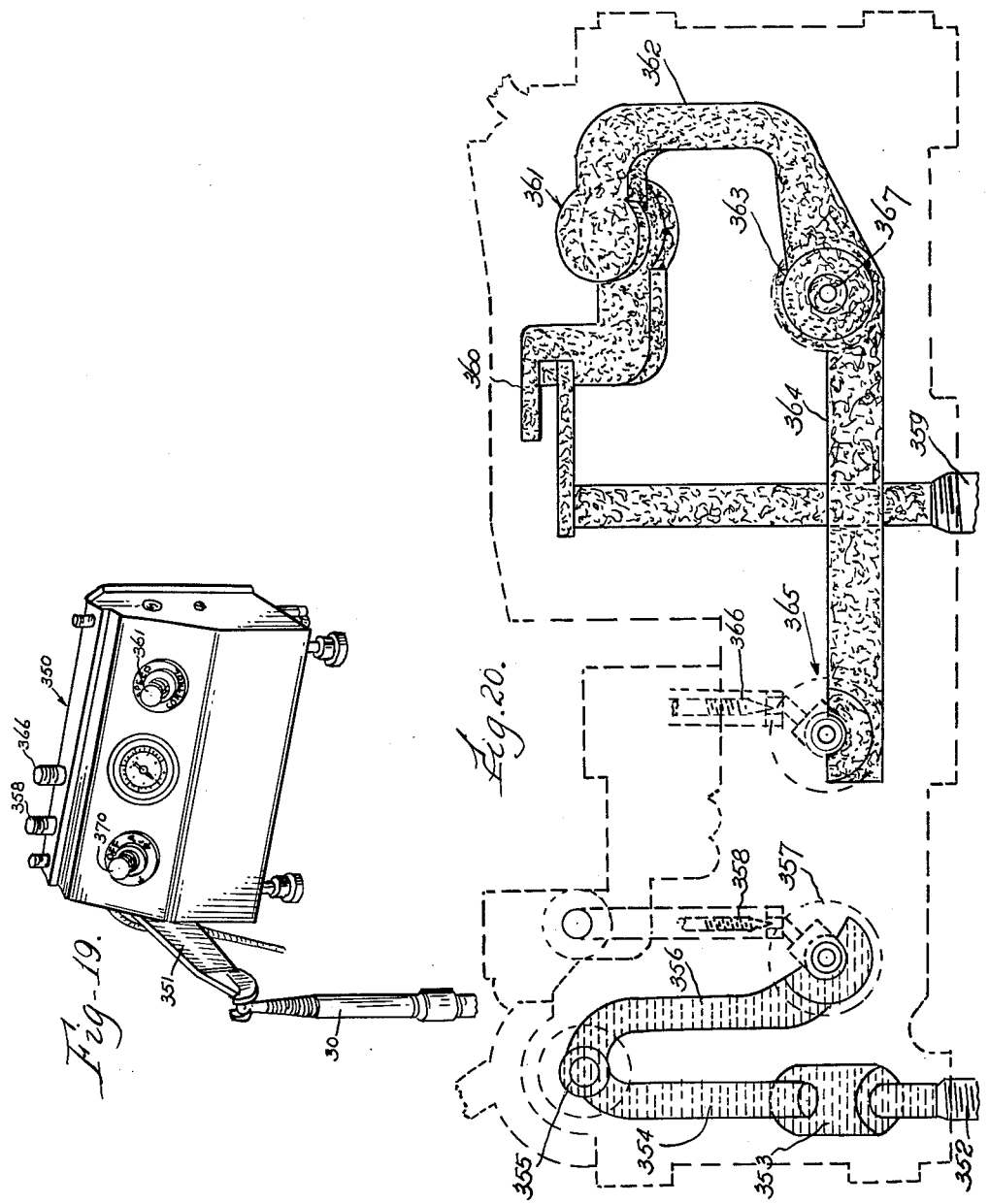

3,054,187
FOOT OPERATED SPEED CONTROL UNITS AND SYSTEMS FOR AIR DRIVEN DENTAL HANDPIECES
Martin Staunt, Des Plaines, Ill.
(4439 W. Rice St., Chicago 51, Ill.)
Filed Apr. 11, 1960, Ser. No. 21,293
2 Claims. (Cl. 32—27)

The present invention relates to foot operated speed control units and systems for air driven dental handpieces, and is particularly concerned with the provision of an improved foot operated air valve and electric switching arrangement for use with air driven dental handpieces.

One of the objects of the invention is the provision of an improved foot operated speed control unit for air driven dental handpieces which permits the user to turn on the air drive for the handpieces and to regulate the speed from zero to maximum up to 250,000 r.p.m. and to simultaneously turn on the flow of cooling water which is entrained with the air spray directed on all sides of the dental bur into the cavity and also enabling the user to turn off the air drive and water with his foot and to turn on the flow of chip cleaning air into the cavity without removing the handpiece from the mouth, but only moving the handpiece until the bur is out of the cavity and the chip air is directed into the cavity.

Another object of the invention is the provision of an improved foot actuated speed controlling unit of the class described which gradually varies the speed from zero to maximum, and which can also be used to cut off the drive air and water and turn on the chip air by another movement of the foot.

Another object of the invention is the provision of an improved speed control unit for air driven dental handpieces which promotes greater safety in its operation, since it is impossible to start the handpiece control by this unit at high speed, which might result in injury to the patient; and it is necessary always to begin at low speed, and speed up gradually after the tool has been properly located adjacent the tooth.

Another object of the invention is the provision of an improved foot controller for air driven dental handpieces which is so constructed that the dentist is not required to shift his weight, but the foot controller may be operated by the dentist by rotating his foot upward or downward on the heel of the foot, causing his toe to operate upon the camming surface of the foot controller pedal to control the speed of operation of the handpiece.

Another object of this invention is the promotion of safety for the patient and the dentist and a reduction of fatigue on the part of both the patient and the dentist, and the reduction of time required for the preparation of cavities, and the promotion of steadiness on the part of the dentist in manipulating the cutting instrument when operating at high speeds.

Another object of the invention is the reduction of ball bearing wear, and increasing the useful life of the ball bearings of the air driven dental handpiece, since the ball bearings are more likely to skid instead of rotating, due to inertia, when started at high speed; and when the handpiece is started slowly from zero speed, the ball bearings are less likely to skid, thus reducing excessive wear on the ball bearings.

Another object of the invention is to permit the dentist to change quickly from drilling to chip blast and back to drilling and to promote maximum visibility and higher accuracy in the preparation of cavities in a minimum amount of time, since the dentist need not change his position; and he need not hang up the contra angle on the supporting hook while picking up an air syringe to clean out the cavity, which permits the patient to change his position, and requires readjustment when the handpiece is again to be applied to the tooth with the methods of the prior art.

Another object of the invention is to permit the dentist to change quickly from drilling to chip blast and back to drilling, as a single and continuous operative procedure, instead of interrupting the operation, to hang the handpiece up and reach for an air syringe, as was done in the methods of the prior art; thus maximum visibility, greater accuracy in the preparation of cavities and reduction of total time are achieved, since the dentist need not change his position and the patient likewise cannot change position, eliminating the former necessity for readjustment with respect to the changed position of the patient upon reentering the mouth to continue the restorative procedure.

Another object of the invention is the provision of tooth drilling equipment which may be operated at the ultra high speeds and power that are required for cutting tooth enamel, but which is also adapted to be operated at even slower speeds with less power, such as are desirable for the removal of various material and for finished cutting in the dentine of the teeth.

Another object is the provision of an improved foot actuated controller which is so arranged that the switch is operated prior to the opening of the air drive valve so that the control cabinet manifold pressure is first relieved, preventing an initial surge of air at starting which would cause the bur to rotate unexpectedly.

Another object is the provision of an improved foot actuated controller which is so arranged that a normally closed contact in the electric switch, opens the chip air solenoid, in the control cabinet, simultaneously with the closing of the drive air solenoid, upon release of the foot pedal, so as to bleed off all air pressure in the cabinet manifold and connecting line; this prevents an initial surge of air at starting of the handpiece that could cause the bur to rotate unexpectedly.

Other objects and advantages of the invention will be apparent from the following description and the accompanying drawings, in which similar characters of reference indicate similar parts throughout the several views.

Referring to the seven sheets of drawings accompanying this specification,

FIG. 1 is a view in perspective showing my foot operated controller for an air driven dental handpiece mounted adjacent a standard foot controller for engine driven handpieces;

FIG. 2 is a bottom plan view of the supporting bracket for the foot operated controller;

FIG. 3 is a top plan view of the mounting brackets;

FIG. 4 is a sectional view taken on the plane of the line 4—4 of FIG. 3, looking in the direction of the arrows;

FIG. 5 is a fragmentary sectional view on a larger scale taken on the plane of the line 5—5 of FIG. 3, looking in the direction of the arrows;

FIG. 6 is a top plan view of the controller;

FIG. 7 is a side elevational view of the controller;

FIG. 8 is a vertical sectional view taken on the plane of the line 8—8 of FIG. 6, looking in the direction of the arrows;

FIG. 9 is a vertical sectional view taken on the plane of the line 9—9 of FIG. 6, looking in the direction of the arrows;

FIG. 10 is a horizontal sectional view taken on the plane 10—10 of FIG. 7, looking in the direction of the arrows;

FIG. 10A is a fragmentary enlargement of part of FIG. 10;

FIG. 11 is a wiring diagram;

FIG. 12 is a side elevational view of an air driven dental handpiece of the type controlled by my foot operated controller;

FIG. 13 is an end elevational view taken from the left of FIG. 12 on an enlarged scale;

FIG. 14 is a fragmentary top plan view of the handpiece head of FIG. 13;

FIG. 15 is a fragmentary bottom plan view of the handpiece head;

FIG. 16 is an elevational view of the air turbine unit;

FIG. 17 is a vertical sectional view taken through the hand piece of FIG. 12 on the plane of the line 17—17 of FIG. 14;

FIG. 18 is a similar sectional view extending from the right end of FIG. 17;

FIG. 19 is a view in perspective of the air and water supply unit;

FIG. 20 is a diagrammatic view of the air and water supply unit, including the conduits and locating the elements of FIG. 19;

FIG. 21 is a top plan view of the controller casting, showing the various conduits therein.

Referring to FIG. 1, 150 indicates a standard foot controller for a dental engine of the electric motor type driven by means of belts and pulleys. 151 indicates the cable containing the electric conductors leading to the motor; and 152 indicates the control lever, which has two pedals 153 and 154 extending from the opposite sides of the electric controller 150.

In order to locate the present foot actuated controller for air driven handpieces in a convenient position, this air drive controller 165 is carried by a circular base 156 at one side of the arm 157 between the normal positions of the pedals 153, 154 and out of the range of movement of those pedals.

The base 156 has a laterally extending arm 157, which may be rectangular, and which is provided at its right end with an upwardly pressed rectangular formation 158 having a central aperture 159 located in a circular depressed area 160.

The aperture 159 is adapted to receive a single screw bolt, the head of which is recessed in a soft rubber layer of foam rubber 161, which is adhesively secured to the bottom of the bracket, and which has a rectangular aperture 162 and a circular aperture.

The top of the pressed formation 158 is also covered with a soft foam rubber pad 164, both these pads being adhesively attached to the bracket.

By means of the single screw bolt extending through the aperture 159 and threaded into the foot operated controller 165 the controller may be clamped in any desired rotative position relative to the electric controller 150.

The supporting base 156 has three sheet metal guide straps 166, 167, and 168 pressed out of its body sufficiently, as shown in FIG. 5, to provide a horizontally open slot for passing the adjustable radial clamping members 169, 170, and 171, each of which has a sliding body 172 provided with an end slot 178a for receiving a screw bolt 174, which has its head spaced from the floor by the lower rubber pad 161; and the screw bolts 174 are threaded into the straps 166–168 for clamping the sliding members 169–171 in any adjusted position.

The base 156 is also cut away to receive the body of each clamping member 169–171 between the edges 175 of radial slots extending into the base 156 at each clamping member 169. Each clamping member is upwardly offset at 176 so that it may extend over a portion 177 of the base and through the slot beneath the straps 166–168, where the clamping members are secured by the screw bolts 174.

Each clamping member 169–171 has an upwardly and inwardly curved flange, which is adapted to grip the projecting annular edge 179 of the engine controller 150.

These flanges 178 (FIG. 4) are preferably dipped in rubber to prevent marring of the edge 179, which is clamped by them.

One of the clamping members, such as member 171, is provided with an auxiliary U shaped member 180 having the ends of its legs welded to the clamping member 171 and also dipped in rubber, forming an insulated opening 181 for receiving and holding the hoses 182, 183 and electrical conductor 184 extending from the unit 165.

Referring to FIGS. 6 and 7, these are top plan and side elevational views of the foot controller unit 165, which preferably comprises a cast metal body 200 which is generally rectangular in shape, having a flat top 201 and rectangular sides 202, 203, 204 with an inwardly extending rectangular slot 205 in the front side 206.

The walls of the slot 205 are formed by a pair of forwardly projecting lugs 207, 208, which may have aligned through bores 209 for receiving a pivot pin 210, which may be secured in place by an elongated set screw 211 having a slot which is accessible from the bottom 212, the set screw being threaded into a threaded bore 213 and extending into engagement with the pivot pin 210. The set screw preferably extends into an annular groove 217 in the pin 210.

The side wall 204 is provided with a pair of integral diagonally extending lugs 214, each of which has a threaded bore 215, 216 for receiving the hose fittings 218 for attachment of the hoses 182, 183.

The pivot pin 210 serves as a pivotal mounting for a foot lever 219, which is preferably of angular shape, having an upwardly extending flange or arm 220 and a forwardly extending arm or flange 221. Both these arms are relatively wide, being as wide as the width of the slot 205 in the body 201.

The lower corner 222 of the foot lever 219 is provided with a slot extending to the dotted line 223, leaving a pair of downwardly lugs 224 supporting another pivot pin 225, upon which a metal roller 226 is mounted.

The body 201 supports a water ejector assembly of the type shown in FIG. 9, which is the subject of a separate application, Ser. No. 857,010, filed December 3, 1959, now Patent No. 3,007,544, for Combined Filters and Water Ejectors for Air Lines; and this water ejector is mounted in a threaded bore 227, which is closed by screw plug 228.

The water ejector is for the purpose of filtering the air and separating it from the water of condensation which may have condensed in the lines leading to the foot controller, as such water tends to be mixed with the oil used, which is edible and water soluble; and such water tends also to swell the ball bearing retainers; and the water must, therefore, be eliminated.

The water ejector is mounted in the circular bore 229, which communicates with an air inlet 230 and with a smaller counterbore 231 having a gasket 232 against which a rigid porous filter sleeve 233 is seated and held by a metal sleeve 234 carried by screw plug 227.

The filter 233 passes water which collects in the space 235 at the end of counterbore 231 and is adapted to be discharged through the bore 236 in a threaded fitting 237, which is threaded into the bore 238.

The threaded fitting 237 engages a gasket 239 by means of an annular flange effecting a water-tight seal at this point; and the fitting 237 has a central aperture 241 against which a conical surface 242 on a piston rod 243 engages.

The piston rod has a cylindrical surface at 244 and a second cylindrical surface at 245 separated by a groove 246, which has frusto-conical walls.

The fitting 237 has an internal groove 247 receiving an O ring 248 adapted to effect a liquid-tight seal against either cylindrical surface 244 or 245, but passes water when the O ring 248 is in registry with the groove 246. Thus the aperture 241 is sealed off by the O ring 248, but is open to the discharge of water whenever the groove 246 passes the O ring by movement of the piston rod 243.

At its upper end the piston rod 243 supports a piston 249, which may have a reduced portion 250 of the rod pressed into a bore 251. The piston has a predetermined clearance at 252 in the cylindrical bore 253, passing some air at all times; and the piston has a cylindrical skirt 254 with grooves 255 and through apertures 256, passing air to the holes 257 and annular space 258 when the piston bottom surface rises above the lower edge of the internal groove in cap 228. Sleeve 234 carries an O ring 234a in a groove to seal the lower end of the sleeve 234.

The operation of the water ejector is as follows: When the air is turned on, entering the inlet fitting 218 in the threaded bore 216, the air pressure lifts the piston 249 and momentarily the groove 246 passes through the O ring 248; and the air pressure ejects condensed water through the aperture 241. Piston 249 passes to an upper position in which the aperture 241 is closed by an O ring engaging cylindrical surface 245; and further ejection of the water is prevented and passage of air is prevented at the opening 241 until the air pressure is shut off, when piston 249 again passes downward to the position of FIG. 9, again ejecting condensed water from the aperture 241 during this motion.

The outlet from the water ejector bore 229 is by way of a bored conduit 259 to a bore 260 at the rear end of the metering valve 261, which is also in communication with a bore 262 at the bottom end of the chip air valve 263. Dry and filtered air is controlled by either of these valves, the outlets from which are in communication with each other through the cross conduit 264 and the outlet conduit 265 leading to the outlet port 215.

The metering valve 261 comprises a cylindrical member having its outer end 266 in position to be engaged by the roller 226 on the foot lever 219; and the metering valve 261 is slidably mounted in a cylindrical bore 267 in a screw plug 268, which has its outer threads 269 threaded into a threaded bore 270 in the body 200.

Bores 271 in the end of the plug are for receiving a spanner wrench; and the annular flange 272 about the metering valve has a tapered groove 273 for receiving a seal ring 274, which engages the cylindrical body 275 of the metering valve, establishing a dust-tight seal at the point of engagement. An O ring 274a is carried in a groove in plunger 275, effecting an air-tight seal with bore 322.

The screw plug 268 has a reduced cylindrical body 276 extending into counterbore 277; and a gasket 278 is clamped between the end of plug 268 and the annular surface 279 to establish an air-tight seal at this point.

The screw plug 268 has a plurality of through bores 280 extending through its reduced portion 276 to the bore 267; and the screw plug 268 carries an enlarged cylindrical end portion 281, which has a peripherally extending groove 282 supporting an O ring 283, which establishes a seal in the counterbore 277. Thus the air space 284 is sealed at both ends.

At its inner end the metering valve 261 has a cylindrical concentric lug 285 and a seating surface 286 for receiving a compression coil spring 287, the other end of which is seated in the complementary counterbore 288; and the spring 287 urges the metering valve 261 toward the position of FIG. 8.

The annular edge 289 in the plug enlargement 281 at the end of bore 267 acts as a valve seat for engaging an O ring 290 contained in a groove 291, which extends about the metering valve 261 at the left side of an annular flange 292.

When the parts are in the position of FIG. 8, the valve is closed at 290, 289; but when the metering valve 261 is pushed inward toward the right, the valve is opened at 289, 290; and the metering valve 261 has a flattened portion 293 which establishes a gradually increasing opening between the flat 293 and the edge 289, gradually increasing the air flow from zero to maximum as the metering valve 261 moves inward toward the right in FIG. 8.

Thus the metering valve 261 is adapted to control the flow of driving air from zero to maximum by means of pressure on the horizontal portion 221 of pedal 219.

The user may turn on the drive air, causing the air driven handpiece to start from zero air and zero speed; and the speed may be varied gradually up to maximum or held at any desired speed by holding the foot pedal 219 at any desired position.

The foot pedal 219 is preferably actuated by pivoting the foot on the heel or the ball of the foot; and the flow of air is automatically stopped by lifting or removing the toe from the lever 219, the spring 287 closing the metering valve 261.

The chip air valve 263 comprises a cylindrical metal member having its outer cylindrical surface 294 slidably engaged in a bore 295 in a second screw plug 296. The screw plug 296 has an enlarged threaded portion 297 threaded into a threaded bore 298 in the body 200; and the enlarged threaded portion 297 engages a gasket 299 seated at 300 in the threaded bore 298, effecting an air seal at this point.

The screw plug 296 has a reduced cylindrical body 301 which slides into a smaller counterbore 302 and is provided with a groove 303 carrying a rubber O ring 304, effecting a seal at this end of the body 301. Between the O ring 304 and gasket 300 the reduced body 301 has an annular groove 305, which is in communication with the cross port 264 and with the outlet 215.

There is another annular groove 306 on the inside of the bore 295 and a plurality of through apertures 307 joining the grooves 305 and 306.

The edge of the reduced plug 301 at the end of bore 295 is indicated at 308 and serves as a valve seat to be engaged by an O ring 309 which is seated in a groove 310 above an annular flange 311 on the end of the chip air valve 263.

The chip air valve 263 also has a flattened portion 312, establishing a conduit from a point inside the O ring 308 to the groove 306, so that when the chip air valve is opened at 310 and 308, air may flow from the bore 262 backward along the chip air valve 263 at the flattened portion 312 to the groove 306, apertures 307, groove 305, and cross port 264, which is in communication with the outlet 215.

The chip air valve 263 also has an annular groove 313 containing a rubber O ring 314, effecting a seal between the valve member 263 and the upper end of the bore 295. At its upper end the valve member 263 may have a tapered portion 315 receivable in a tapered bore 316 in a foot actuated disc 317, which is secured on the plunger 263 by a flush head screw bolt 318 threaded into a threaded bore 319 in the valve plunger 263.

A coil spring 320 has one end located in an annular groove 321 on the lower side of the disc 317 and engages the body 298 with its other end, urging the chip air valve 263 into the closed position.

The volume and pressure of the chip air is controlled at the control unit for the air driven handpiece; and the chip air valve 263 is used for turning on the chip air with the foot on the disc 317 whenever the user wishes to clean out a cavity; and for this purpose he must remove his foot from the air control pedal 219, so that the handpiece is always stopped when cleaning chip air is used.

Referring to FIG. 10, this is a sectional view taken through the body 200 on a horizontal plane, showing the location of the air valve plunger 261 inside the slot 205 adjacent the electrical plunger 321 for controlling the electrical circuits by means of which the solenoid valves are actuated for controlling the flow of drive air, chip air, and water.

The body 200 has a cylindrical bore 322 for slidably receiving the electrical plunger, the end 323 of which projects farther than the air plunger 261 so that the electrical plunger is adapted to be actuated first, prior to the initial opening of the metering valve. This action sequence provides for the unloading of the control cabinet manifold pressure and prevents an initial surge of air at starting, which would cause the handpiece bur tube to rotate unexpectedly.

The electrical plunger 321 has a reduced portion 324 between two cylindrical portions 325 and 326; and there are frusto-conical portions 327 and 328 at each end of the reduced portion for camming a roller 329 outward. At its inner end 330 the electrical plunger 321 has a cylindrical bore 331 receiving a coil spring 332, which has its other end seated on a central pin 333.

Spring 332 urges the electrical plunger outward to the position of FIG. 10, and FIG. 10A.

The cylindrical bore 322 communicates with a cavity 334 by means of a window opening 335 extending to the bore; and the cavity 334 houses a microswitch unit 336, which is secured by a pair of screw bolts 337, and which has three electrical terminals 338, 339, and 340.

A leaf spring 341 is secured by screw bolts 337 to one end of the switch unit 336 in position to engage a switch button 343, but is biased away from the switch button. The leaf spring 341 carries at its end a U-shaped stirrup 344 having a pivot pin 345 rotatably mounting the roller 329.

The corresponding terminals 338, 339, and 340 are shown at the switch unit 336 in the wiring diagram of FIG. 11.

The microswitch 336 is of the type having the snap button 343 normally on open circuit at 340 and on closed circuit at 338. When the button 343 is pressed inward by leaf spring 337, the switch unit 336 opens at the contact 338 and closes at the contact 340; but when the plunger 321 is released by lifting the foot on the air control pedal 219, the button 343 moves to the position of FIG. 11 and FIG. 10 with the circuit closed at 338 and open at 340.

The operation of the electrical plunger 321 is as follows: When the foot pedal 219 is pressed, and before the air metering valve 261 is opened, the camming surface 327 engages roller 329 and moves leaf spring 341 into engagement with button 343, which is pressed inward to close the circuit at 340 and open the circuit at 338.

The roller 329 is then riding on the cylindrical surface 325 as long as the foot pedal is pressed inward. When the foot pedal is released, the parts again move to the position of FIG. 10, opening the circuit at 340 (FIG. 11).

Referring to FIGS. 12–18, these are views illustrating the air driven dental handpiece, which is driven and controlled by the foot controller. The handpiece 30 (FIG. 12) has a tubular handle 31 with an obtuse angle 32 and a neck 33 supporting the contra angle head 34.

This head comprises a substantially cylindrical housing 35 tapered at its lower end at 36 and having one end 37 open to expose the shaft and the other end closed by a threaded cap 48. Cap 48 has a central aperture 50 for passing air carrying lubricant mist, which lubricates the ball bearings at this end of the housing; and the apertures 51 are for a spanner wrench.

The cap 48 is rounded at 52 to join with the head housing.

Referring to FIG. 15, this is a fragmentary bottom plan view of the head 34, which is tapered down to the annular end surface 37, having a circular aperture 38 for exposing the end of the shaft 39, which has a tubular bore 42 frictionally securing a plastic chuck sleeve 43 having a cylindrical bore 44 for gripping the shank of a bur 112.

There is a clearance 40 between the annular end 41 of the shaft 39 and the bore 38 which acts as an air nozzle, directing air in a conical direction toward the end 111 of the bur 112, this also being part of the drive air which lubricates the lower bearings with air mist.

The neck 33 has brazed to it the nozzle conduits 144 for water and 145 for chip air, each of which has its end directed to discharge water or air toward the bur 111; and the controls are so arranged that the drive air and cooling water from the nozzle 144 are turned on at the same time or off at the same time.

When they are off, the chip cleaning air from nozzle 145 may be turned on by means of the foot to clean out the cavity without removing the handpiece from the mouth.

Referring to FIG. 16, this is an elevational view of the air turbine unit 58, which is preferably removable from the head housing 35, as it has a cylindrical shell 67, which fits in the head housing bore. Shell 67 has a laterally extending lug 72 (FIG. 17) which slides in an axial groove inside the head housing 35 and locates the inlet aperture 138 for drive air and the outlet aperture 110 for exhaust air in proper position to register with the conduits 139 and 140 located in the neck 33.

The shell 67 extends inward at the bottom to engage the top of the lower outer race 106 of the lower ball bearing assembly 61. The top of the shell 67 engages the upper flange of a stator 77, which has an annular groove 81 registering with the air inlet conduit 139.

The upper ball bearing assembly 57 has its outer race seated in a bore in the stator 77; and the top of the outer race is engaged by the cap 48.

The shaft 39 carries a cylindrical rotor 105 which has a tubular extension 93 engaging the upper inner race and another tubular extension 92 engaging the lower inner race, which race is seated against an annular shoulder on the frusto-conical head 65, which defines the annular conical nozzle 40.

The conical nozzle 40 is slightly enlarged at 66 at its end to increase the amount of air discharged; and the water from the water nozzle 144 is caused to rotate and is atomized by being sprayed into the conical air spray from the annular nozzle 40.

The upper outer race is secured to the shaft by the screw cap 102; and the balls in the races hold the ball bearings in assembled condition and make the turbine assembly 58 a removable unit.

The water and air conduits 144, 145 pass into the handle at the neck 33 (FIG. 17) and are connected to electrical conductors so that these conduits, which are of electrical resistance metal, may serve as heaters, if desired.

In other embodiments heaters for heating the water and the air may be located in the control unit, which is shown in FIG. 19.

Referring to FIG. 19, this is a view in perspective of a control cabinet 350, which is provided with a forked arm 351 for supporting the handpiece 30.

FIG. 20 is a diagram showing the most important parts of the control cabinet, which includes a water inlet 352 leading to a water filter 353. A conduit 354 extends to a water pressure regulator 355 from which a conduit 356 extends to a water solenoid valve 357, which controls a water outlet to the handpiece, also including a metering needle valve 358. Thus the volume and pressure of the water may be regulated, and the water may be turned on or off electrically.

The air supply inlet is indicated at 359, extending to an air filter 360, which has a conduit extending to an air pressure regulating valve 361, the outlet of which is connected by conduit 362 to an air solenoid valve 363, which controls the flow of air to a lubricator. A further conduit 364 extends to a third solenoid valve 365 having a needle valve 366 for controlling chip air.

The outlet from the drive air solenoid 363 is indicated at 367; and it is connected to the lubricator (not shown), which provides the drive air with lubricant in the form of a mist that lubricates the ball bearings by passing through the ball bearings about the balls.

The present foot controller has its inlet 183 connected to the air compressor, and its outlet 182 connected to the air inlet 359 of the control cabinet, FIG. 20.

The further details of the control unit are shown in my prior application, Ser. No. 798,866, filed March 12, 1959, on Control Unit for Air Driven Dental Handpieces, of which this is a continuation-in-part, the specification and drawings of which are hereby incorporated herein by reference thereto.

Referring to the wiring diagram of FIG. 11, 368 indicates the back plate of insulation and 369 the front plate of insulation of a rotary switch indicated at 370 in FIG. 19. This rotary switch has two rotating annular contacts 371 and 372 which are in the open position at the line contact 373 and the other contact 374.

The 110 volt 60 cycle line is indicated at 375 and 376; and the latter conductor 376 extends to the common terminal 339 of the microswitch, which is adapted to control the handpiece by control of this line conductor.

The rotary switch 370 has a left hand position indicated by the word "Spray" in FIG. 11, in which fixed contact 377 is closed.

When the rotary switch is rotated to the left to the "Spray" position, the circuit is conditioned to close the water solenoid 357 and the drive air solenoid 363.

When the switch is turned to the right hand position, as indicated by the word "Air," the circuits are conditioned for the closing of the chip air solenoid 365; but this solenoid is also controlled by the microswitch 336 so that the user may turn on the chip air after turning off the drive air and water to blow air into the cavity to clean it out and to dry the cavity without removing the handpiece, and then grinding may be resumed.

It will thus be observed that I have invented an improved control system by means of which the user may control the speed of operation of the handpiece from zero to maximum; and by removing his foot from the speed control pedal the user may open the chip air valve, all of which is accomplished by the foot, leaving the hands of the user free for other operations.

While I have illustrated a preferred embodiment of my invention, many modifications may be made without departing from the spirit of the invention; and I do not wish to be limited to the precise details of construction set forth, but desire to avail myself of all changes within the scope of the appended claims.

Having thus described my invention, what I claim as new and desire to secure by Letters Patent of the United States, is:

1. A mounting for the air valve of an air driven dental handpiece, comprising a sheet metal base plate having a circular body and a radially extending arm, said arm adapted to support a drive air valve body provided with a pivoted bellcrank lever, said circular body being adapted to support a round dental engine controller and having a plurality of angularly spaced radially extending sliding clamps, each clamp comprising a sheet metal member of uniform width and thickness having at its outer end an upwardly and inwardly turned clamping formation, each said member having a longitudinally extending slot in its other end, said circular body having a plurality of straps punched out of said body sufficiently to provide a radially extending guide for each clamping member, each guide having a threaded bore provided with a threaded bolt, said bolt being also received in the slotted end of each clamp, said bolts having lower heads engaging each clamp on the opposite sides of each slot to secure the clamps in fixed position on said base plate.

2. A mounting according to claim 1, in which the upwardly and inwardly turned clamping formations are rubber covered and the bottom of the base plate is provided with a rubber pad of shape similar to the base plate and having a circular aperture exposing said screw bolt heads for actuation by a tool to adjust the clamps.

References Cited in the file of this patent
UNITED STATES PATENTS

| | | |
|---|---|---|
| 1,182,706 | Priest | May 9, 1916 |
| 1,324,713 | Adsit | Dec. 9, 1919 |
| 1,720,389 | Binks | July 9, 1929 |
| 1,729,802 | Smith | Oct. 1, 1929 |
| 2,014,642 | Andrews | Sept. 17, 1935 |
| 2,648,234 | Lester | Aug. 11, 1953 |
| 2,748,229 | Block | May 29, 1956 |
| 2,855,672 | Franwick et al. | Oct. 14, 1958 |
| 2,911,010 | Lamburn | Nov. 3, 1959 |

OTHER REFERENCES

Stephens: British Dental Journal; Volume 100 (pages 345–350; pages 347–348 relied upon) June 19, 1956. (Copy in Division 55.)